United States Patent

[11] 3,614,086

| | | |
|---|---|---|
| [72] | Inventor | Thomas Wilbur Bushnell<br>E. Aurora, N.Y. |
| [21] | Appl. No. | 836,469 |
| [22] | Filed | June 25, 1969 |
| [45] | Patented | Oct. 19, 1971 |
| [73] | Assignee | J. W. Clement Company<br>Depew, N.Y. |

[54] FLUIDIC CALIPER
6 Claims, 5 Drawing Figs.

[52] U.S. Cl.................................................. 270/56, 271/56
[51] Int. Cl........................................................ B65h 43/02
[50] Field of Search........................................ 270/54, 55, 56, 58; 271/47, 56, 57

[56] References Cited
UNITED STATES PATENTS
1,738,180   12/1929   Frazier......................... 270/56
2,992,822   7/1961   Fraidenburgh................ 271/57
3,191,925   6/1965   McCain......................... 270/56

*Primary Examiner*—Robert W. Michell
*Assistant Examiner*—L. R. Oremland
*Attorney*—Bean & Bean ABSTRACT: A fluidic caliper adapted for use with a signature- or sheet-collating system, wherein the caliper is adapted to detect a malfunction in delivery of a signature by a feeder onto a collating conveyor. The caliper includes a feeler arm positionable in accordance with the feeding condition of the feeder, and a feeler arm detector having a pair of proximity sensors cooperating to produce a signal indicative of the position of the feeler arm. The caliper includes means associated with the feeler arm, which is adapted to permit the caliper to be readily adjusted in accordance with the thickness of a signature whose presence is to be detected.

PATENTED OCT 19 1971 3,614,086

INVENTOR.
THOMAS W. BUSHNELL
BY
Bean & Bean
ATTORNEYS

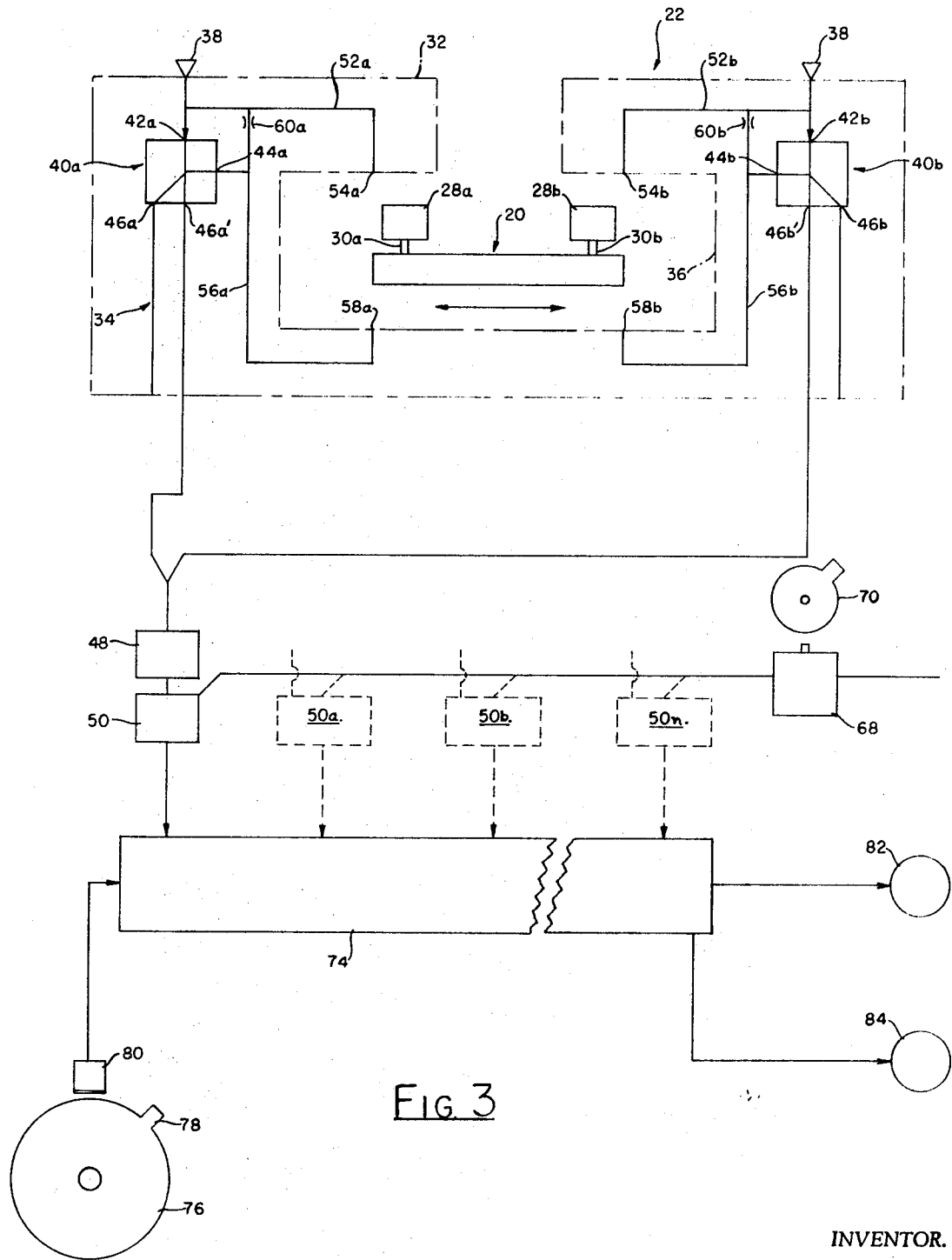

FLUIDIC CALIPER

BACKGROUND OF THE INVENTION

Heretofore, calipering devices of which I am aware, have been fully mechanical in nature, including a feeler arm positionable in accordance with the feeding condition of a feeder and a complex mechanical linkage movable during prescribed portions of the signature-feeding cycle for the purpose of sensing by positive physical engagement the position of the feeler arm. These prior calipering devices are costly to manufacture and require extensible maintenance, due to wear occurring between relatively moving parts of the mechanical linkage, which would otherwise result in improper caliper operation.

SUMMARY

The present invention relates to a fluidic caliper adapted to detect a malfunction in the delivery of a signature by a feeder onto a signature-collating system conveyor. More particularly, the present invention is directed toward a fluidic caliper adapted for use in a signature-collating system of the general type disclosed in U.S. Pat. application, Ser. No. 711,041, filed Mar. 6, 1968, wherein there is provided an electrical monitoring device including a shift register adapted to receive signals from a plurality of calipers in accordance with the position at which a malfunction occurs along the conveyor and being effective to reject an imperfect book at a station beyond the last of the series of the system feeders.

The present fluidic caliper includes a feeler arm, which is movable between first and second positions indicative of a malfunction in the signature-feeding operation, but is positionable in an intermediate position when a signature of a predetermined thickness is properly fed by a feeder. In the preferred embodiment of the present invention, the feeler arm is provided with a pair of deflector blades alternately positioned in a blocking relation with respect to either of a pair of fluidic air streams when the feeler arm is not in its intermediate position. The fluidic air streams are produced by a fluidic circuit, including a pair of fluidic elements shiftable to produce a malfunction output signal when either of the air streams is blocked. A monitoring device control signal is produced if the malfunction signal occurs during a prescribed portion of the signature-feeding cycle.

The deflector blades are made adjustable with respect to the feeler arm, so as to permit ready adjustment of the caliper in accordance with the predetermined thickness of a signature whose presence is to be detected.

DRAWING

The present invention will now be more fully described with reference to the accompanying drawings wherein:

FIG. 3 is a diagrammatic view of the fluidic circuit employed in the caliper of the present invention in association with a collating system monitoring device.

DETAILED DESCRIPTION

Figure 1:
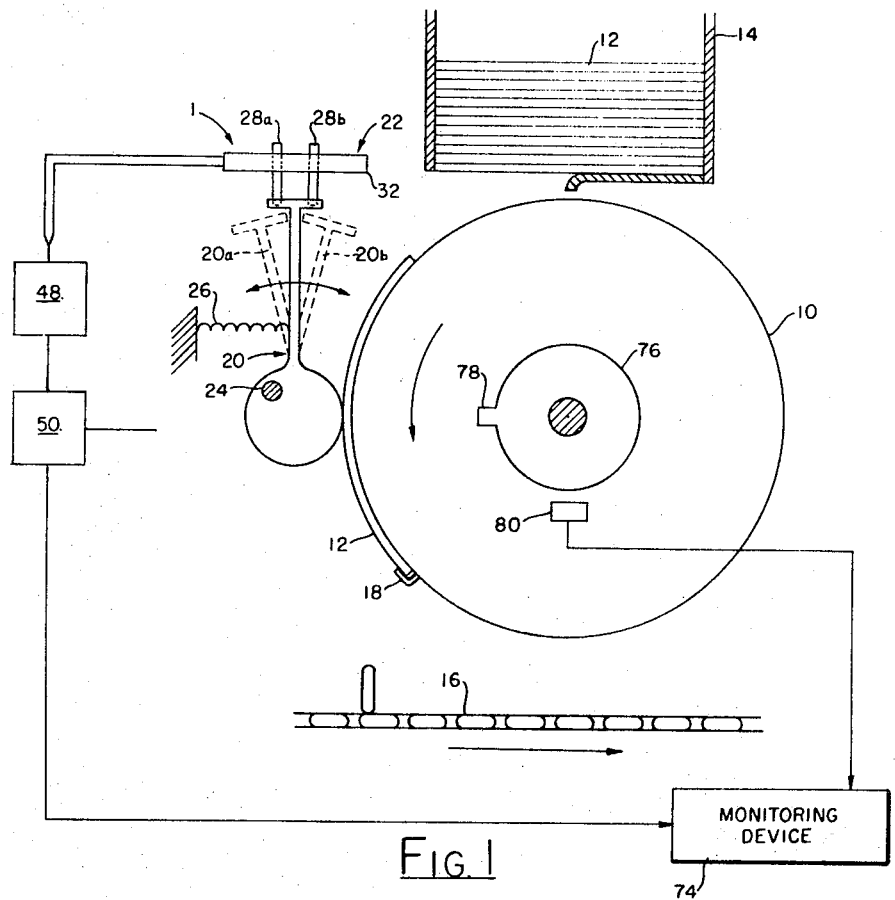
FIG. 1 is a fragmentary, diagrammatic, side elevational view showing the relationship of parts of a collating system employing the present invention.

In Fig. 1, the caliper according to the present invention is generally designated as 1 and shown as being associated with a signature-collating system, which conventionally includes a series of aligned feeders 10 adapted to deliver signatures 12 from associated magazines 14, onto a collating conveyor 16. Conveyor 16 is arranged to travel from left to right, as viewed in Fig. 1, in order to deliver books of assembled signatures at the right hand end of the conveyor past the last of the series of feeders to a book-binding facility or the like, not shown. The number of feeders employed in any given system will depend upon the number of different signatures that are to be collated into book form.

Feeders 10 and conveyor 16 may be of any preferred type and form no part of the present invention, but are of course preferably driven from a common power source, not shown, so as to synchronize the delivery of signatures to the conveyor as it advances the signature collation sequentially from one feeder to another. However, to facilitate understanding of the present invention feeders 10 are shown as being of the type adapted to dispense only one signature during each full rotational cycle thereof and for this purpose as being provided with a single signature-clamping device 18, operable to alternatively clamp and release such signature. Furthermore, each feeder would include in combination a pickup device, not shown, which is adapted to pickup the bottommost signature from magazine 14 and thereafter transfer same into association with feeder-clamping device 18.

Calipers 1, provided one in association with each of feeders 10 are employed in the collating system for the purpose of detecting or sensing the occurrence of signature-feeding malfunctions. A malfunction may be in the form of the failure of the pickup device to timely deliver a signature, the delivery of more than an intended number of signatures or the delivery of a signature which is rendered faulty because of having more or less than a predetermined number of pages or because of being torn or otherwise mutilated.

Caliper 1 is shown in Fig. 1 as including a signature feeler or sensing arm 20 and a feeler arm detector device 22. Feeler arm 20 is pivotally supported on eccentrically located pin 24 and normally biased by tension spring 26 into a rest or normal position, wherein it is disposed in engagement with the peripheral surface of feeler 10, as indicated at 20a in phantom line in Fig. 1 and full line in Fig. 2b. It will be understood that when feeder 10 is rotated to deliver a signature 12 of a proper or predetermined thickness into contact with feeler arm 20, the latter is forced to pivot against the bias of spring 26 into an intermediate position, shown in full line in Figs. 1 and 2a; and that the feeler arm is forced into a variable second position, indicated at 20b in phantom line in Fig. 1 and full line in FIG. 2c, when the signature being fed is of greater than the predetermined thickness, or plural superposed signatures are carried by the feeder. When a signature being delivered is faulty, due to having less than a predetermined thickness, feeler arm 20 will be moved thereby into a position between its rest and its intermediate positions, which, together with its rest position defines a variable first position. Thus, it can be said that the positioning of feeler arm 20 in either of its first or second positions during the signature delivery portion of the feeder rotational cycle is indicative of a signature delivery malfunction.

Figure 2A:
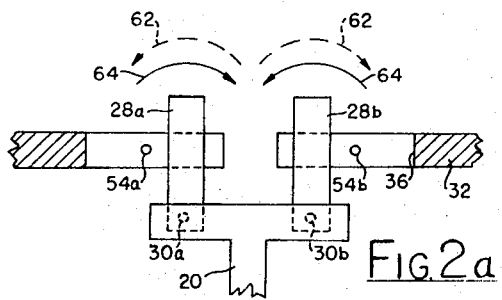
FIGS. 2a-2b are fragmentary views illustrating alternative positions of the feeler arm forming a part of the present fluidic caliper.

Since feeders 10 are adapted to deliver sheets or signatures having a relatively wide range of thicknesses, caliper arm 20 would preferably include suitable means, indicated at 27, for the purpose of providing a rough or original setting of the caliper arm in its intermediate position indicated in Fig. 2a regardless of the thickness of the signature whose deliver it is desired to detect. A pair of deflector blades 28a, 28b are pivotally affixed to the upper end of feeler arm 20, as by adjustment screws 30a, l 30b. The blades are made adjustable relative to the feeler arm for the purpose of permitting fine adjustment thereof with respect to detector 22 in order to compensate for variations in the degree of feeler arm swing between for example its rest and rough-set intermediate positions, occasioned by thickness differences between signatures to be detected.

Detector device includes a thin housing 32, which is suitably affixed to the framework of the machine and adapted to partially enclose a fluidic circuit generally designated as 34 in Fig. 3. Housing 32 is shown in phantom plan view in Fig. 3 as being of channel-shaped configuration having a recess 36 adapted to freely receive deflector blades 28a, 28b, as feeler arm 20 is moved between its first and second positions, indicated in Figs. 2b and 2c, respectively.

Again referring to Fig. 2, it will be seen that a continuous and uninterrupted supply of pressure fluid, such as clean, dry, fluidic air, indicated universely by drafting symbol 38, is provided for powering fluidic circuit 34.

Fluidic circuit 34 includes a pair of identical elements in the form of monistable flip-flops 40a, 40b. Flip-flops 40a, 40b are of conventional construction having power fluid inlets 42a, 42b, to which fluidic air is directed from supply 38; control input ports 44a, 44b; and output ports 46a, 46a' and 46b, 46b' respectively. In the present circuit arrangement, output ports 46a, 46b are vented to atmosphere, whereas output ports 46a' 46b' are connected to a diaphragm operator 48, which in turn serves to control closing of electrical switch 50.

Supply 38 is also vented to atmosphere within housing recess 36 via lines 52a, 52b and outlet ports 54a, 54b. Branched from lines 52a, 52b are control lines 56a, 56b, which terminate in outlet ports 58a, 58b arranged in aligned relationship to outlet ports 54a, 54b, respectively. Control input ports 44a, 44b are connected into lines 56a, 56b downstream of resistances 60a, 60b.

Under operating conditions when outlet ports 54a–58b are unblocked or unobstructed, fluidic air is vented through such ports; the flow through to ports 58a, 58b being somewhat less than through ports 54a, 54b. The circuit arrangement is such that under these conditions, the fluidic air outputs of flip-flops 40a, 40b are vented to atmosphere through ports 46a, 46b. Thus, a zero pressure signal is applied through ports 46a', 46b' to diaphragm operator 48, which remains in a nonoperated condition. In the nonoperated condition of diaphragm operator, switch 50 is open.

Figure 2C:
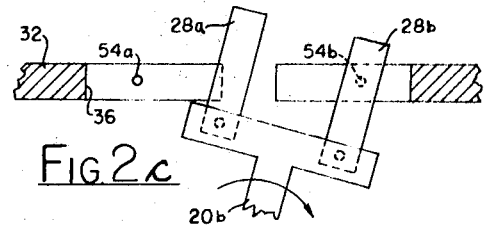
Figure 2B:
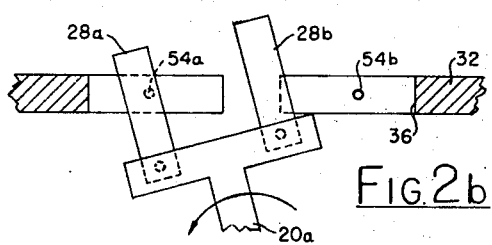

Now referring particularly to Figs. 2b and 2c, it will be understood that when feeler arm 20 is pivoted into either of its first or second positions, deflector blades 28a, 28b serve to alternately block or obstruct the venting of supply fluidic air through outlet ports 54a, 58a and 54b, 58b, respectively. When, for instance, outlet ports 54a, 58a are blocked, the resultant flow conditions at flip-flop 40a from outlet port 46a to 46a'. The fluidic air passing through outlet port 46a' constitutes a malfunction signal, which serves to operate diaphragm operator 48, which in turn serves to close electrical switch 50. It will be apparent that when outlet ports 54b, 58b are blocked by deflector blade 28b, the circuit controlling flip-flop 40b performs in a similar manner, such as to switch the output thereof to outlet 46b', which in turn serves to operate diaphragm operator 48. Thus, circuit 34 constitutes a pair of identical proximity sensors alternatively operable by deflector blades 28a, 28b.

For purposes of illustration, deflector blades 28a, 28 b are shown as being parallel and equally spaced, respectively, from outlet ports 54a, 58a and 54b, 58b when the feeler arm 20 is in an intermediate position determined by a signature having a thickness intermediate the range of signature thicknesses which feeder 10 is designed to accommodate. Adjustment of the caliper in order to compensate for variations in the degree of caliper swing occasioned by signature thickness variations between collating runs, caused by either the number of sheets in the signature being varied to form a different book, or the use of a different paper sheet thickness for forming the same signature, may be readily accomplished by adjusting the deflector blades 28a, 28b. Since a thin sheet or signature would produce only a slight swing, whereas a thick or plural signature would produce a relatively large swing, deflector blades 28a, 28b should alternatively be pivoted slightly apart, as indicated by arrow 62, and pivoted towards one another, as indicated by arrow 64 in order to compensate therefor.

In Fig. 3, switch 50, as well as switches 50a–50n associated with the remaining calipers employed in the collating system, is shown as being placed in series circuit with microswitch 68. Microswitch 68 is closable to complete a circuit through switch 50 upon engagement thereof with cam element 70. Cam element 70 is suitably driven by the collating power source, not shown, such that it is operable to close microswitch 68 only during that portion of the rotational cycle of feeder 10, during which a signature is to be delivered past caliper feeler arm 20 onto conveyor 16. Thus the condition of switch 50 is in effect scanned only during that portion of the signature-feeding cycle for which the position of the feeler arm is meaningful so far as indicating the occurrence of a malfunction. Otherwise, switch 50 would produce a control signal during nondelivery portions of the feeder rotational cycle when feeler arm 20, due to the action of return spring 26, is disposed in its rest position, wherein ports 54a, 58a are blocked.

It will of course be understood that in collating systems of the type shown, wherein feeders 10 are synchronized during each rotational cycle, microwswitch 68 would be connected in series with each of switches 50–50n and be operated only once during each rotational cycle of the feeders. When, however, plural signatures are to be fed successively by the same feeder during each cycle, microswitch 68 would be actuated a corresponding number of times. When the system employs plural groups or banks of feeders having different rotational cycles between groups, it would be necessary to provide a separate microswitch control for each group.

While the malfunction signal which effects the closing of electrical switch 50 during the normal delivery portion of the feeder rotational cycle may be employed to automatically stop operation of the entire collating system and given an appropriate signal that a particular feeder had malfunctioned, it is preferable to pass such signal to an electrical monitoring device, which is generally designated as 74 in the drawings and may be of the type described in detail in U.S. Pat., Ser. No. 711,041, filed Mar. 6, 1968.

Monitoring device 74 would include a shift register adapted to receive signals from the system calipers in accordance with the position at which malfunction occurs along the collating conveyor and be effective to reject an imperfect book at a reject station, not shown, beyond the last of the series of feeders without interrupting the otherwise high-speed operation of the system unless more than a predetermined number of successive malfunctions are sensed by the same caliper.

Monitoring device 74 is driven by a signal produced by a suitable transducer 76 driven in synchronization with the feeders. For purposes of illustration, transducer 76 is shown as including a rotatably supported disc having magnetic element 78 adapted to sweep past a pickup 80 once during each rotational cycle of feeder 10. The input pulse produced by transducer 76 is timed to shift monitoring device 74 subsequent to operation of microswitch 68 and thus, the introduction of any malfunction control signal into the monitoring device. The shift register included within monitoring device 74 would in turn be defined by a plurality of serially connected functional elements, not shown, corresponding in number to the number of feeders involved in the series of feeders performing the building of completed books on the collating conveyor; switches 50–50n being connected one into each of such functional elements. It will be understood that when switch 50 and microswitch 68 are simultaneously closed, there is produced an information "bit", which is inserted in a corresponding functional element; such bit being thereafter shifted through the register during succeeding feeder rotational cycles so that when an imperfect book stemming from a malfunction reaches a reject station, a reject mechanism controlled for instance, by a solenoid 82, is actuated to reject the imperfect book. The monitoring device would also preferably include a malfunction information storage arrangement, which would permit stopping of the collating system, as by energizing a solenoid 84, when a predetermined number of successive malfunctions occur at any given feeder.

It will be apparent that circuit arrangements other than that specifically illustrated may be employed for the purpose of closing switch 50 upon positioning of the feeler arm in either its first or second positions. In this respect, it is envisioned that the malfunction signal from flip-flop outlets 46a', 46b' would be passed to a OR/NOR gate whose output would be applied to the diaphragm operator. Another arrangement susceptible for use in the practice of the present invention, would be to connect the flip-flop outlets 46a, 46b to a diaphragm operator of the type which serves to close the electrical switch when a zero or negative pressure signal is applied thereto. In yet another arrangement, the deflector blades could be employed to block outlet ports 54a, 58a and 54b, 58b when the feeler arm is in its intermediate position; one or the other of such ports being unblocked when the feeler arm is in its first or second positions. It will also be apparent that the rough-set adjustment of the feeler arm may be dispensed with, in which case compensation for variation for caliper swing occasioned by differences in signature thicknesses would be effected by pivoting both deflector blades in the same direction.

I claim:

1. A fluidic caliper for use with a signature or sheet-collating system, wherein said caliper is adapted to detect a malfunction in delivery of a signature by a feeder onto a collating conveyor, said caliper comprising in combination:

a signature feeler arm;

means for supporting said feeler arm for movement during a signature delivery portion of the operational cycle of said feeder in accordance with the signature delivery condition of said feeder along a path between first and second position indicative of a signature delivery malfunction and an intermediate position indicative of a normal signature delivery, said feeler arm normally residing in said first position during other portions of said operational cycle intermediate said signature delivery portion thereof; and fluidic air circuit means, said circuit means including first and second feeler arm proximity sensors for alternately producing malfunction indicating signals when said feeler arm is in one of said first and second positions, respectively, and means for receiving said signals and for applying a control signal to said system whenever a malfunction indicating signal is received thereby during said signature delivery portion of said operational cycle, said sensors each including fluidic air gate means having first and second conditions, said gate means when in one of said conditions producing a malfunction indicating signal, and fluidic air control means responsive to positioning of said feeler arm in one of said first and second positions for switching its associated gate means into said one condition thereof.

2. A fluidic caliper in accordance with claim 1, wherein said feeler arm includes a pair of members, said control means are spaced apart in a direction aligned with said path movement, said members are alternatively movable into proximity one with each of said control means when said feeler arm is in one of said first and second positions thereof, respectively; said control means being responsive to the proximity of said members; and means to adjust each of said members with respect to said feeler arm.

3. A fluidic caliper according to claim 2 wherein said receiving means includes diaphragm-operated electric switch means operable by said malfunction indicating signal, and means to scan the condition of said switch means only during said signature delivery portion of the operational cycle of said feeder.

4. A fluidic caliper according to claim 2 wherein said feeler arm is supported for pivotal movement about an axis between said positions thereof, and said members are supported on said feeler arm for independent adjustable movement about a pair of axes arranged substantially parallel to said axis.

5. A fluidic caliper according to claim 4 wherein each said control means includes a fluidic air switching input to its associated gate means and an air jet blockable by an associated member when said feeler arm is moved into one of said first and second positions, said air jet when blocked causing said switching input to switch said gate means between said first and second conditions thereof.

6. An improved fluidic caliper for use in a signature or sheet-collating system of the type having calipers serving to detect malfunctions in the delivery of signatures by feeders onto a collating conveyor and an electrical monitoring device including a shift register having functional elements associated one with each of said feeders and adapted to receive a control signal from the caliper associated with such feeder indicative of a malfunction in the delivery of a signature thereby, said device being effective in response to said control signal to reject a book rendered imperfect by a malfunction at a station beyond the last feeder of said system, said improved caliper comprising a combination;

a signature feeler arm means for supporting said feeler arm for movement during a signature delivery portion of the operational cycle of a feeder with which it is associated between first and second positions indicative of a malfunction in signature delivery and an intermediate position indicative of a normal signature delivery;

resilient means for normally biasing said feeler arm into said first position thereof during other portions of said operational cycle intermediate said signature delivery portion thereof;

first and second feeler arm proximity sensors for alternately producing malfunction indicating fluidic signals when said feeler arm is in one of said first and second positions, respectively, said sensors each including fluidic air gate means having an output switchable between outlets thereof and a control input means, said input means defining a fluidic air switching input to said gate means and a fluidic air jet blockable by said feeler arm when moved into one of said first and second positions, whereby when said jet is blocked said switching input is operable to switch said output of an associated gate means between said outlets thereof, the presence or absence of an output in one of said outlets constituting a malfunction indicating signal;

first electrical switch means, said first switch means being electrically connected with the functional element associated with said feeder and being connected in fluid communication with said one outlet of each of said gate means, said first switch means being closable by said malfunction indicating signals; and second electrical switch means, said second switch means being closable during said signature delivery portion of said feeder operational cycle to establish an electrical circuit through said first switch means, whereby when both said first and second switch means are closed, a control signal is applied to said functional element.

UNITED STATES PATENT OFFICE
CERTIFICATE OF CORRECTION

Patent No. 3,614,086            Dated October 19, 1971

Inventor(s) Thomas Wilbur Bushnell

It is certified that error appears in the above-identified patent and that said Letters Patent are hereby corrected as shown below:

Column 2, line 45, after "predetermined" insert -- number of pages, and thus less than a predetermined -- ; line 57, "deliver" should read -- delivery -- ; line 61, "1" should be canceled before "30b". Column 3, line 1, "Fig. 2" should read -- Fig. 3 -- ; line 38, after "flip-flop" insert -- control inlet 44a, effects switching of the output of flip-flop -- . Column 4, line 12, after "synchronized" insert -- and deliver only one signature -- ; line 13, "microwswitch" should read -- microswitch -- . Column 6, line 23, "a" should read -- in --; line 24, after "arm" insert -- ; -- .

Signed and sealed this 31st day of October 1972.

(SEAL)
Attest:

EDWARD M. FLETCHER, JR.          ROBERT GOTTSCHALK
Attesting Officer                Commissioner of Patents